United States Patent [19]

Leary

[11] Patent Number: 5,012,725
[45] Date of Patent: May 7, 1991

[54] THREE POSITION ACTUATOR FOR SHIFTING A TWO SPEED TRANSFER CASE

[75] Inventor: Richard C. Leary, Troy, Mich.

[73] Assignee: Rockwell International Corporation, Pittsburgh, Pa.

[21] Appl. No.: 511,360

[22] Filed: Apr. 19, 1990

[51] Int. Cl.[5] .............................................. F01B 7/00
[52] U.S. Cl. ........................................ 92/63; 92/62; 92/65; 92/110; 92/151; 74/335; 74/346
[58] Field of Search .................. 92/61, 62, 63, 65, 75, 92/50, 69, 110, 129, 130 R, 150, 151, 152; 74/335 X, 346 X, 364

[56] References Cited

U.S. PATENT DOCUMENTS

| 787,479 | 4/1905 | Tanner | 92/65 |
|---|---|---|---|
| 2,298,359 | 10/1942 | Ernst et al. | 92/65 |
| 3,752,040 | 8/1973 | Pawloski et al. | 92/151 |
| 3,766,793 | 10/1973 | Knop | 74/335 |
| 3,968,735 | 7/1976 | Boisde et al. | 92/151 |
| 3,978,884 | 9/1976 | Sundströ92 | 65/ |
| 4,141,220 | 2/1979 | Feucht | 92/151 |
| 4,205,594 | 6/1980 | Burke | 92/151 |
| 4,593,606 | 6/1986 | Klatt et al. | 92/65 |
| 4,817,766 | 4/1989 | Nilsson | 74/335 |

FOREIGN PATENT DOCUMENTS

| 3213757 | 1/1983 | Fed. Rep. of Germany | 92/65 |
|---|---|---|---|
| 0049479 | 4/1979 | Japan | 92/65 |
| 0046108 | 4/1981 | Japan | 92/65 |
| 0184708 | 11/1982 | Japan | 92/65 |
| 0166107 | 10/1983 | Japan | 92/65 |
| 359979 | 3/1962 | Switzerland | 92/65 |

Primary Examiner—John T. Kwon
Assistant Examiner—Thomas Denion

[57] ABSTRACT

The present invention includes a three position actuator which is used to position the gear range control lever on a two speed transfer case. Three positions are required to achieve HIGH, LOW and NEUTRAL. Two individual air chambers may be selectively charged with compressed air to move two pistons along a common actuator rod to achieve linear translation of the control lever to selectively position the transfer case in HIGH, NEUTRAL or LOW range. The transfer case is shifted from LOW to NEUTRAL to HIGH by releasing the charge of compressed air thereby permitting the return spring to shift the control lever to HIGH gear range. Thus, in the event of failure of the system supplying the compressed air, the actuator will return the transfer case to HIGH gear range which provides an appropriate gear range selection for limp home mode.

6 Claims, 5 Drawing Sheets

LOW    NEUTRAL    HIGH

LOW    NEUTRAL    HIGH

THREE POSITION ACTUATOR FOR SHIFTING A TWO SPEED TRANSFER CASE

BACKGROUND OF THE INVENTION

1. FIELD OF THE INVENTION

The present invention relates to remote actuator devices and specifically to an actuator device which may be used to remotely select a gear range for a two speed transfer case.

2. DESCRIPTION OF THE RELATED ART

Presently two speed transfer case gear selection is accomplished by force applied through a sleeved cable connected to the transfer case gear range control lever. The force is typically applied through a driver operated lever located in the cab of the vehicle. Frictional resistance in the sleeved cable increases the force which the driver must apply to the lever to accomplish a shift of the transfer case. In large trucks the cable must be routed a great distance and often through a circuitous path. Consequently, a great deal of force is required to shift the transfer case through a sleeved cable.

Remote actuator devices are available which derive motive force from compressed air, hydraulic fluid or electrical energy. Simple actuation devices utilizing these sources of motive force are subject to failure upon interruption of the source of motive force. Such a failure manifests itself as a transfer case which is stuck in the gear range previously selected. The previous gear selection is only by coincidence that which is appropriate for limp-home operation. Therefore, there exists a need to provide a stand-by supplemental motive force which will shift the transfer case to a limp-home gear range in the event of interruption of the source of motive force. Return springs are known in the art for achieving this purpose. However, return springs represent an additional force which must be overcome when shifting the transfer case.

The force required to shift the transfer case from HIGH or LOW into NEUTRAL involves a force which must disengage a jaw clutch which is accomplished by moving the clutch axially along a splined shaft. This force requirement peaks at the early portion of the stroke and then drops to a minimum. Conversely, the force required to shift the transfer case to HIGH or LOW om NEUTRAL involves a force which must engage a jaw clutch with a mating gear. This force requirement peaks as the jaw clutch engages the gear and accomplishes synchronization.

These force peaks define minimums necessary to accomplish the shift. In each respective instance, either shifting into engagement or out of engagement, the force peaks are approximately equal. If insufficient force is applied the shift will not occur. If too much force is applied during disengagement, the shift will be prevented due to binding of the engagement splines. In addition, too much force will result in an abrupt shift during engagement risking damage to the respective gears.

An actuator must be designed taking into account the presence of the stored spring force. Thus an actuator must provide a smaller amount of force in the early portion of the stroke and progressively more as the actuator reaches the end of its stroke. Therefore, there exists a need for a simple actuator which can achieve three position control of a transfer case which provides a fail-safe, limp-home gear change while providing equal amounts of force to accomplish respective shifts either into engagement or out of engagement.

SUMMARY OF THE PRESENT INVENTION

The present invention includes a three position actuator which is used to position the gear range control lever on a two speed transfer case. Three positions are required to achieve HIGH, LOW and NEUTRAL. Two individual air chambers may be selectively charged with compressed air to move two pistons along a common actuator rod to achieve linear translation of the control lever to selectively position the transfer case in HIGH, NEUTRAL or LOW range. The transfer case is shifted from LOW to NEUTRAL to HIGH by releasing the charge of compressed air thereby permitting the return spring to shift the control lever to HIGH gear range. Thus, in the event of failure of the system supplying the compressed air, the actuator will return the transfer case to HIGH gear range which provides an appropriate gear range selection for limp home mode.

DESCRIPTION OF THE PREFERRED EMBODIMENTS

Figure 1:
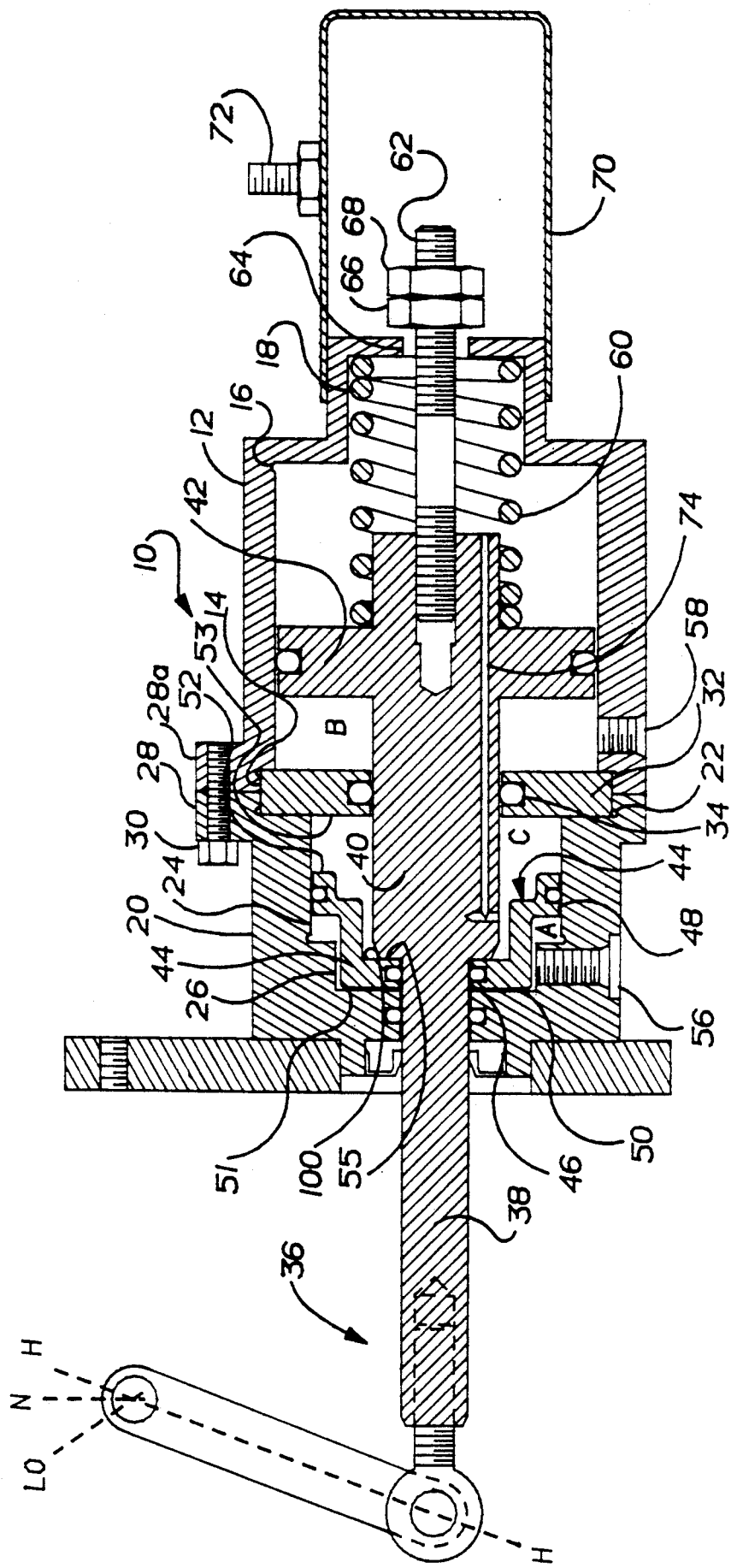
FIG. 1 is a sectional view of the present invention showing the actuator in initial position with the transfer case in high gear range.

The present invention includes an actuator 10 having an actuator rod 36 which reciprocates to selected positions to achieve desired gear range selections (LOW, NEUTRAL and HIGH) on a transfer case (not shown). The actuator consists of a first housing 12 having a bore which includes three annular sections. The first section having a diameter indicated as 14, the second indicated as 16, and the third indicated as 18. A second housing 20 also includes three annular sections. The first section having a diameter indicated as 22, the second indicated as 24, and the third as 26. The two housing portions are connected by a mating flange 28 and 28a which include bolt 30 (or similar fastener) to provide connection therebetween. Piston stop 32 is received in the first annular section of both housings and mechanically interlocked therebetween. Piston stop 32 may be generally described as an annular ring having a center bore having an annular recess receiving sealing ring 34. Actuator rod 36 reciprocates within housing 12 and 20 and includes a first diameter portion 38, a second diameter portion 40 and a third diameter portion 42 which forms a fixed piston. A second slideable piston 44 has a first diameter portion 46, a second diameter portion 48, in addition to a first annular face 50 and a second annular face 52. The first diameter portion 46 of the slideable piston 44 sealingly engages the first diameter portion 38 of the actuator rod 36. The second diameter portion 48 of the slideable piston 44 sealingly engages the second annular section 24 of the housing 20. The first annular face 50 of slideable piston 44 interacts with face 51 of housing 20 to define a travel stop therefore. The second annular face 52 interacts with annular face 53 of piston stop 32 to define a travel stop in the opposing direction. In this manner, annular faces 51 and 53 respectively define the limits of travel of slideable piston 44. A third annular face 100 on slideable piston 44 engages annular face 55 which is located on the actuator rod 36 at the transition between the first and second diameter portions. In this manner, housing 20 and slideably piston 34 define a variable volume chamber A. Chamber A may be connected by port 56 to a source of compressed air to control the pressure in chamber A. A second chamber B is defined by the housing 12, piston 42 and piston stop 32. Chamber B may be selectably connected to a source of compressed air through port 58. Spring 60 is a compression spring which is capable of displacing the actuator rod 36 to the limit of outward extension upon release of compressed air supplied to chamber A and B. A threaded rod 62 extends from actuator rod 36 through bore 64 in housing 12. Two nuts 66 and 68 provide a feature which will be explained later. Shield 70 is a deep drawn stamping which may be placed over the end of housing 12 to protect rod 62. Clearance is provided in bore 64 to permit venting of the spring chamber to atmosphere through vent 72. In addition, the spring chamber is connected through vent passage 74 to prevent trapping air in chamber C.

In operation an initial position, as shown in FIG. 1, is one in which no compressed air is supplied to chamber A or B. In this state spring 60 provides sufficient force to displace and/or maintain actuator 36 in a fully extended initial position. In this position the vehicle will be in HIGH gear range. Thus, in the event of loss of compressed air, if the transfer case is in any gear range other than HIGH, spring 60 will automatically displace the actuator rod 36 returning the transfer case to HIGH (limp-home) gear range.

Figure 2:
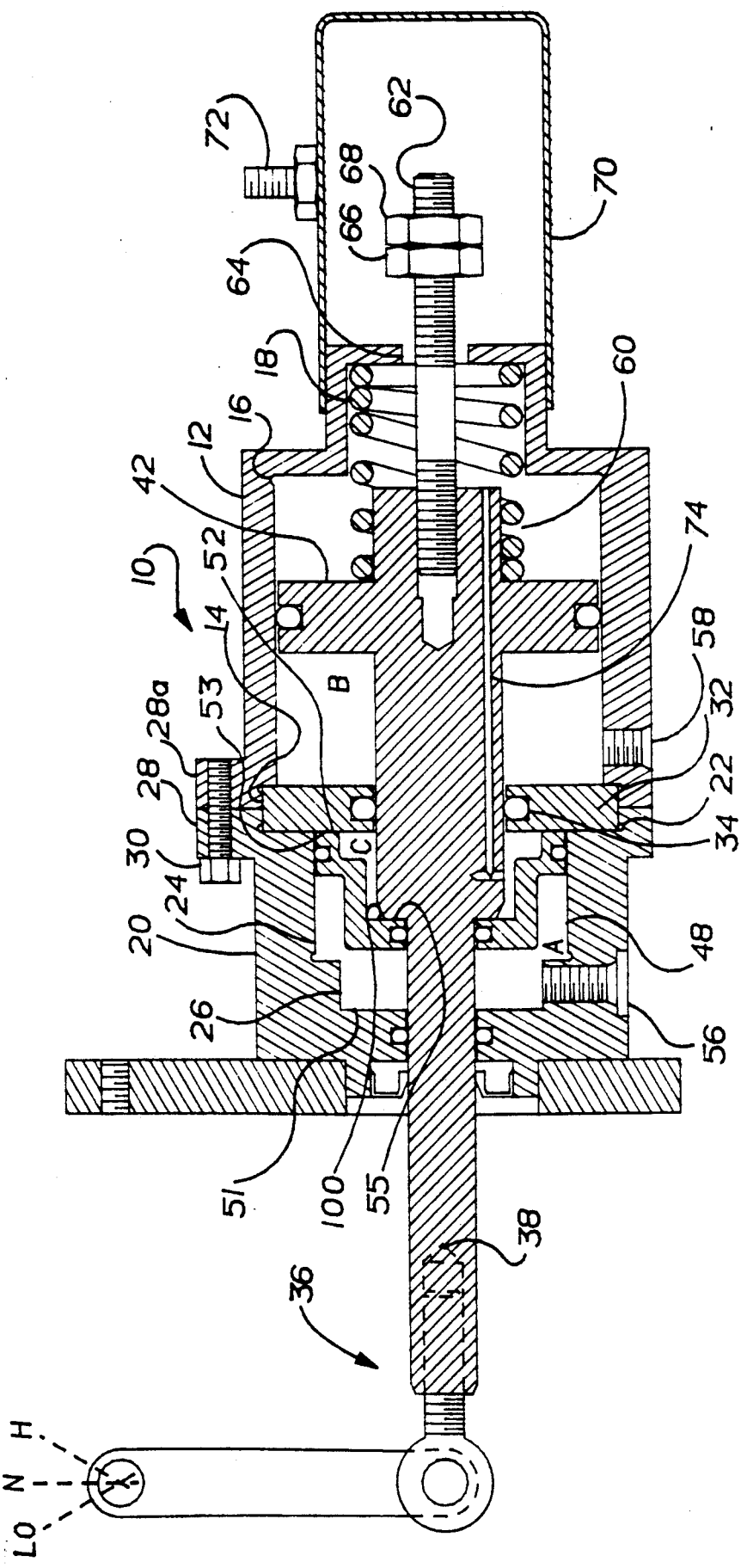
FIG. 2 is a sectional view with the actuator positioned to shift the transfer case into NEUTRAL.
Figure 3:
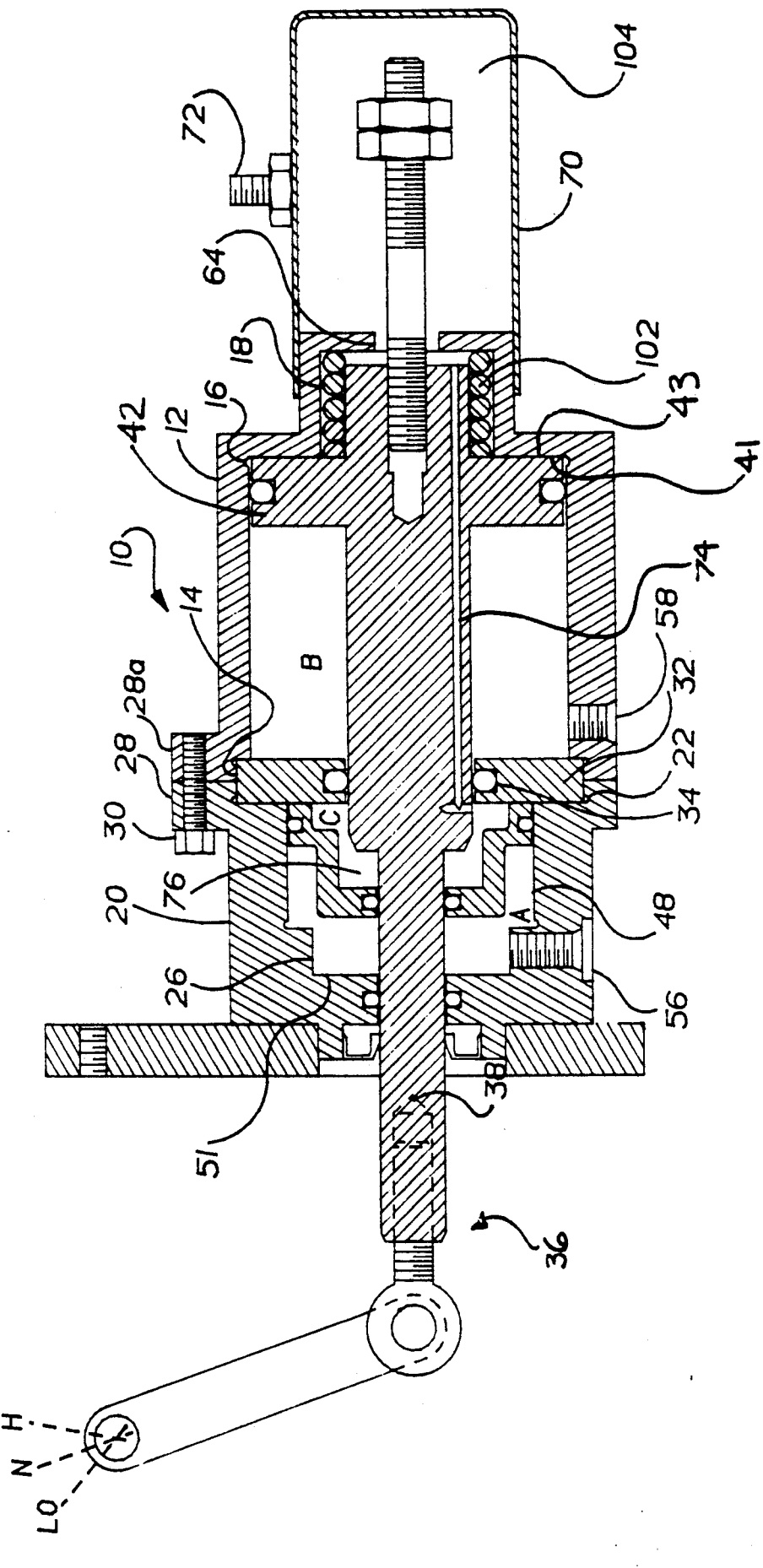
FIG. 3 is a sectional view with the actuator positioned to shift the transfer case into LOW gear range.

If the driver wishes to place the transfer case in NEUTRAL position for towing, compressed air is supplied to chamber A thereby displacing slideable piston 44 from the initial position shown in FIG. 1 to that shown in FIG. 2. When the second annular face 52 engages the annular face 53 of piston stop 32 the slideable piston will cease displacement. Slideable piston annular face 100 which engages face 55 of actuator rod 36 causes the actuator rod to be displaced in conjunction therewith. If the driver desires to continue the shift to LOW gear range, compressed air is directed to chamber B through port 58. Compressed air will displace piston 42 compressing spring 60 until annular face 43 engages annular face 41 as shown in FIG. 3. At this point actuator rod 36 will have reached the end of its travel compressing spring 60 ot its minimum dimension. With actuator rod 36 in this position the transfer case will be shifted into LOW gear range. It may be noted that air trapped in chamber C and the spring chamber will be compressed by the translation of respective components. Vent passage 74 will permit air trapped in chamber C to pass into the spring chamber, through clearance bore 64 to the interior of sheild 70 and ultimately through the atmospheric vent 72. The same avenue just defined may be used in the opposite circumstance when the respective chambers are enlarged.

In the event the driver wishes to change from LOW directly to HIGH, the compressed air to port 56 and 58 is vented to atmosphere enabling the force of spring 60 to move actuator rod 36 to the fully extended position completing the shift into HIGH gear rang (as shown in FIG. 1). Thus, if there is a loss in air pressure, the actuator rod will shift the transfer case into HIGH gear range.

Figure 4:
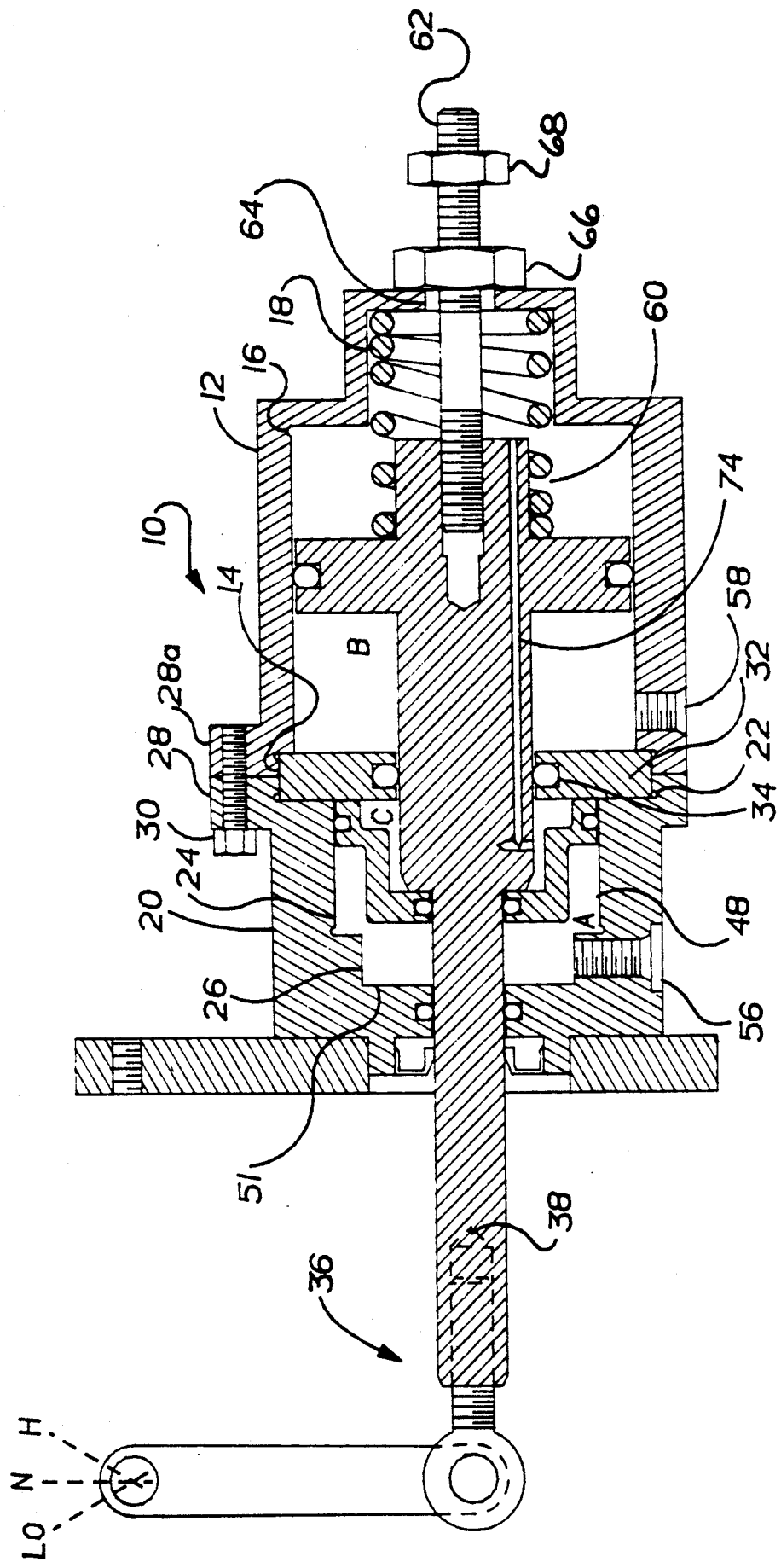
FIG. 4 is a sectional view with the actuator manually shifted to neutral for towing.

In the event of a failure such as this in which the vehicle is disabled and it is desired to tow the vehicle for 195 rod 62 and the respective nuts 66 and 68. By releasing jam nut 68, nut 66 may be rotated in a manner which draws rod 66 through bore 64 (as shown in FIG. 4) causing actuator rod 36 to move the transfer case from HIGH to NEUTRAL position.

Figure 5:
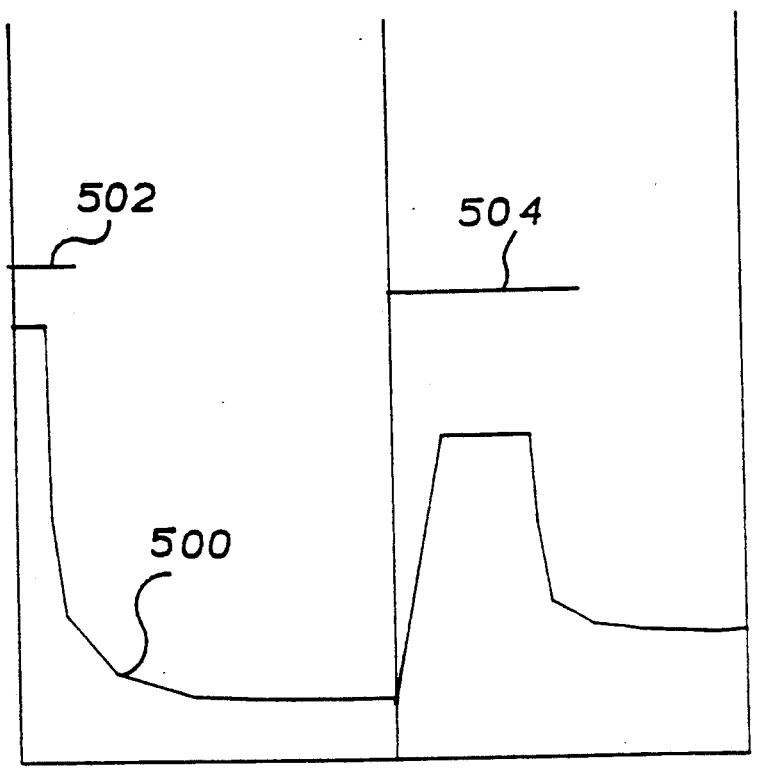
FIG. 5 is an illustration of the forces required to shift the transfer case from LOW to HIGH.
Figure 6:
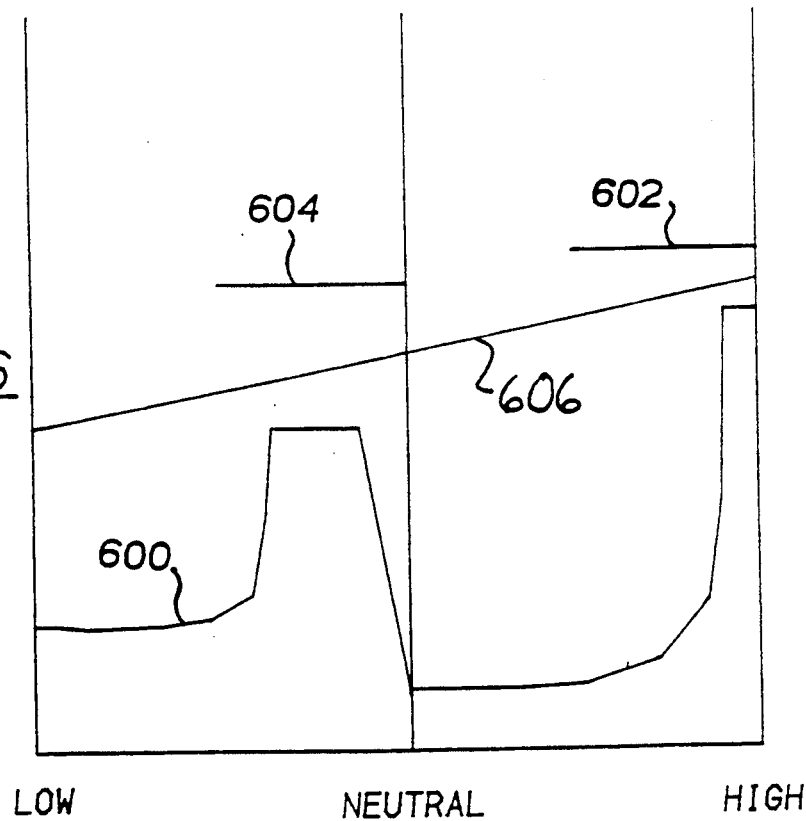
FIG. 6 is an illustration of the forces required to shift the transfer case from HIGH to LOW.

FIG. 5, plot 500 illustrates the minimum force required to shift the transfer case from LOW to HIGH. FIG. 6, illustrates the minimum force required to shift the transfer case from HIGH to LOW. In FIGS. 5 and 6, the Y axis is the force required and the X axis is the length of travel of the actuator. LOW, NEUTRAL and HIGH are shown as discrete positions along the X axis. As shown, the force required to move from LOW to NEUTRAL is initially very HIGH and drops off significantly. The high initial force is a result of a "set " which developes in mating splines between the input shaft and a clutch collar which is positionable axially on a shaft to effect alternative selective engagement of LOW or HIGH gear. This set is intended to facilitate a locking engagement of the transfer case in the respective gear range. Once this "set" is overcome, the force required to complete the shift significantly diminishes. However, if excessive shift force is applied, (as shown by 502) the mating splines will bind and the shift will not be accomplished. An identical force requirement exists in shifting from HIGH to NEUTRAL (as shown by plot 600 in FIG. 6). Again if excess force is applied, the mating splines will bind and the shift will not be accomplished (as shown by 602).

In the alternative, as the shift is made from neutral to either HIGH (as shown in FIG. 5) or LOW (as shown in FIG. 6) a dog type clutch is engaged. If the dog teeth happen to be aligned with the respective engagement aperture, the shift will require minimal force. If the teeth are not aligned, an engagement force is required to accomplish alignment. This force is shown as a very steep slope with a gradual reduction in force required after the dog teeth have moved into engagement. Engaggement force must be limited to values less than 504 and 604 respectively so as to prevent abrupt engagement which may result in damage to the jaw clutch and/or premature failure of the transmission.

The present invention is designed to satisfy the shifting force requirements and accomplish a spring returned fail-safe shift to HIGH in the event of air pressure supply loss. The force provided in the event of air pressure supply loss or upon intentional release of air pressure from chambers A and B is shown as plot 606 in FIG. 6. This force is produced entirely by spring 60 according to the relation; F spring=kX. The spring force remainder shown in initial position or LOW is a result of a partial compression which occurs during installation. When shifting from HIGH to LOW, it is necessary to overcome the spring force by a force as great as the spring force plus the force required to accomplish the shift. This force must be provided by the actuator without providing an excessive amount of force which may cause binding of the spline or abrupt engagement of the jaw clutch teeth. As may be observed, spring force 606 exceeds the minimum shifting force requirements defined by plot 600 while not exceeding the maximum shifting force requirements defined by 602 and 604.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A remote actuator for controlling the position of a gear control lever comprising:
   an actuator rod having a first portion and a second portion;
   a first piston having a first bore disposed for reciprocation on said first portion;
   a second piston fixed to said second portion of said actuator rod for reciprocation therewith;
   a first housing defining a first bore sealingly receiving said first piston;
   a second housing defining a second bore sealingly receiving said second piston;
   means connecting said first and said second housing;
   a connecting wall disposed between said first and said second housing having a bore defined therein for sealingly receiving said second portion of said actuator rod;
   a first chamber defined by said first bore and said first piston which may be pressurized to displace said first piston and said actuator rod from an initial position to a first position;
   a second chamber defined by said second bore and said second piston which may be pressurized to displace said second piston and said actuator rod from said first position to a second position;
   a spring engaging said second piston and said second housing for defining an initial position to which said actuator rod returns upon release of pressure from said first and second chambers;
   said first portion of said actuator rod is smaller than said second portion defining an annular face which may be engaged by said first piston; and said first piston has a first end portion, an intermediate axially connecting portion and a second end portion whereby said first end portion is axially spaced from said second end portion and wherein said first end portion engages said first bore of said first housing to define said initial position and said second end portion engages said connecting wall to define said first position.

2. a remote gear range actuator for controlling the position of a gear control lever comprising;
   an actuator rod having first, second and third portions;
   a first piston disposed for reciprocation on said first portion;
   a second piston fixed to said second portion for reciprocation therewith;
   a first housing defining a first bore adapted for sealingly receiving said first piston;
   said first housing further defining a second bore which sealingly receives said first portion of said actuator rod;
   a second housing defining a third bore adapted for sealingly receiving said second piston;
   means connecting said first and second housing;
   said second housing further defining a fourth bore which permit reciprocation of said third annular portion therethrough;
   a connecting wall disposed between said first and said second housing having a fifth bore defined therein for sealingly receiving said second portion of said actuator rod;
   a first chamber defined by said first bore and said first piston which may be pressurized to displace said first piston and said actuator rod from an initial position to a first position;
   a second chamber defined by said third bore and said second piston which may be pressurized to displace said second piston and said actuator rod from said first position to a second position;
   a spring engaging said second piston and said second housing for defining an initial position to which said actuator rod returns upon release of pressure from said first and second chambers; and
   said third annular portion threadably engaging means for drawing said actuator rod from said initial position to said first position.

3. A remote gear range actuator as in claim 2 wherein said first portion of said actuator rod is smaller than said second portion defining an annular face which may be engaged by said first piston.

4. A remote gear range actuator as in claim 2 wherein said first piston has a first end portion, an intermediate exially connecting portion and a second end portion whereby said first end portion is axially spaced from said second end portion and wherein said first end portion engages said first bore of said first housing to define said initial position asnd said second end portion engages said connecting wall to define said first position.

5. A remote gear range actuator as in claim 2 wherein said means connecting said first and second housing include flanges having respective bores defined therein which interacts with respective annular bores to receive said connecting wall thereby forming a mechanical interlock retaining said connecting wall.

6. A remote gear range actuator as in claim 2 wherein said second housing defines a third bore, said actuator rod has a third annular portion disposed for reciprocation therein, and said third bore and said third annular portion threadably engage means for drawing said actuator rod from said initial position to said first position.

* * * * *